Dec. 6, 1966  J. R. SOLUM  3,289,768
TURBULENCE GENERATING CENTRALIZER
Filed June 19, 1962  3 Sheets-Sheet 1

JAMES R. SOLUM
INVENTOR.

BY Lyon & Lyon
ATTORNEYS

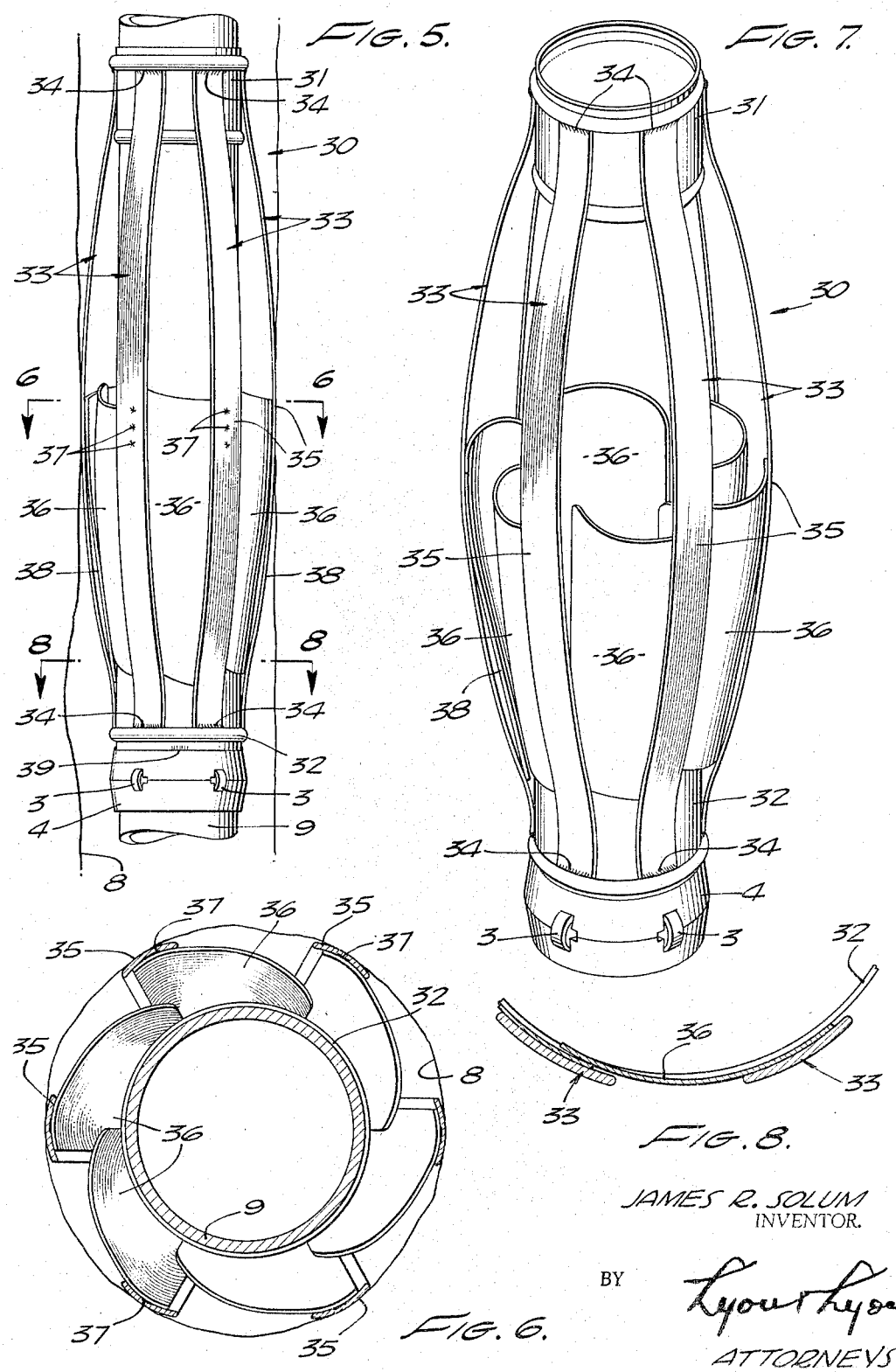

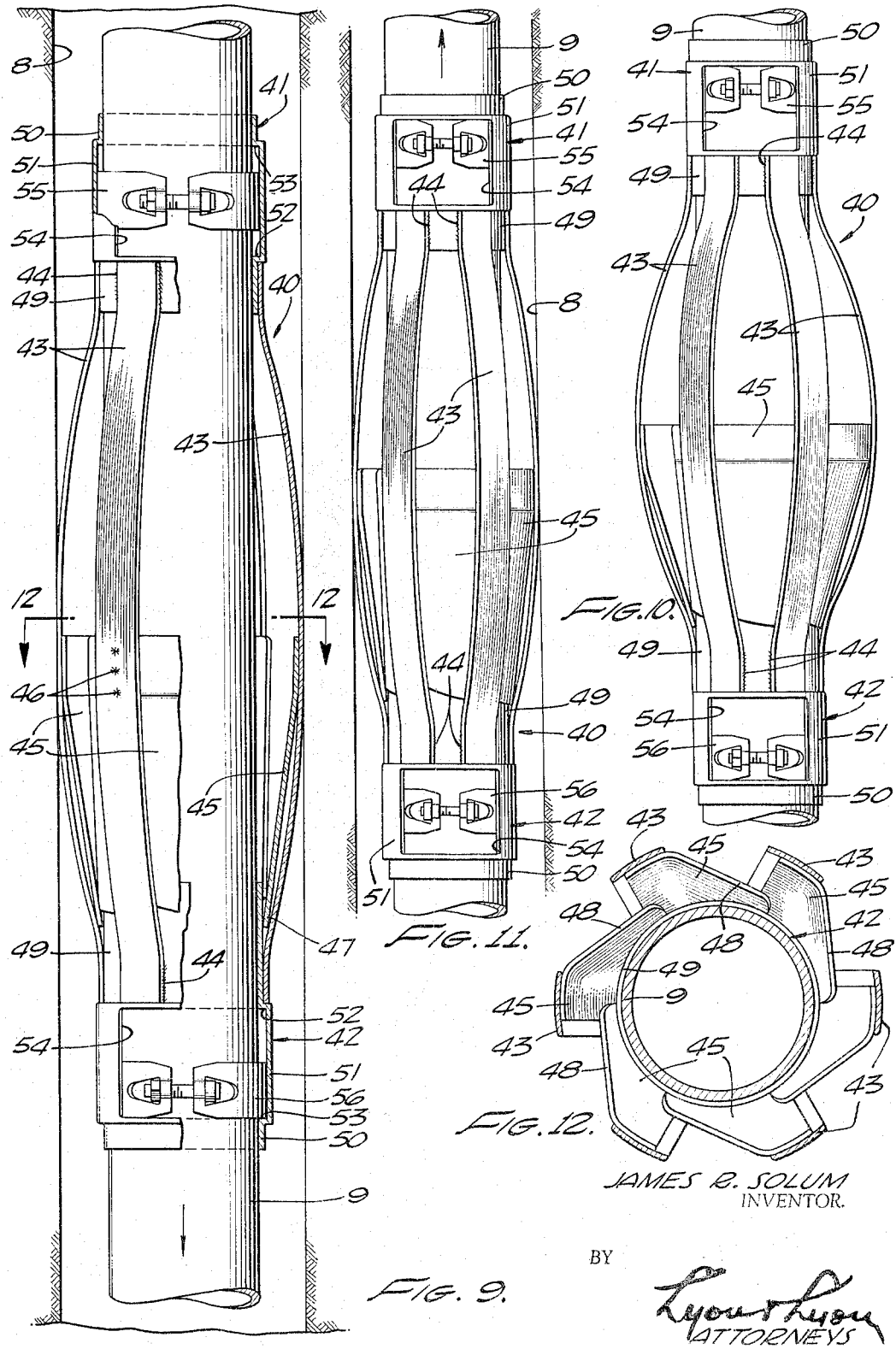

3,289,768
TURBULENCE GENERATING CENTRALIZER
James R. Solum, Los Angeles, Calif., assignor to B & W Incorporated, Torrance, Calif., a corporation of California
Filed June 19, 1962, Ser. No. 203,610
6 Claims. (Cl. 166—177)

This invention relates to a device adapted to be mounted on a well pipe for centering the well pipe in the well bore and diverting the fluid flowing past the device from the normal upward direction of flow in the annular space between the well pipe and the wall of the well bore. There are numerous situations during the drilling and completion of oil or gas wells, such as when a well pipe or casing is being cemented into the well bore, where it is desirable to both center the well pipe in the well bore and to condition the wall of the well bore and the drilling fluid present in the annular space between the well pipe and the well bore. For example, in cementing a well casing within the well bore, it is desirable and sometimes essential that the cement form a nearly perfect bond between the well bore wall and the well casing along the entire length of the casing or at least at certain predetermined locations.

In order to obtain a perfect or nearly perfect bond between a well casing and the well bore, it has been found that the well casing should not contact any portion of the well bore wall and preferably should be centered within the well bore. Numerous devices, commonly known as centralizers, are available for centering the well pipe in the well bore and these devices are widely used to accomplish the centering function during the cementing operation. In addition to the desirability of having the well pipe centered in the well bore for obtaining a good cement bond, it is also highly desirable that the drilling fluid or mud present in the annular space between the well bore and the casing be completely or nearly completely displaced by the cement slurry when the cement slurry is introduced into the annular space.

As is commonly known, the properties of drilling fluids or muds are such that the drilling fluid or mud tends to gel when left in a static condition for any period of time. Due to these properties it has been found that under normal pumping pressures and velocities the drilling fluid which is being pumped upwardly in the annular space assumes a channelling flow condition whereby only part of the fluid within the annular space is being pumped upwardly. This channelling flow is a result of some of the drilling fluid becoming gelled and the flowing fluid merely assuming an arbitrary course of flow through the gelled drilling fluid. If the cement slurry is introduced into the annular space under these channelling flow conditions, the cement slurry will follow this established course of channelling flow and therefore there will not be a complete displacement of the drilling fluid from the annular space.

In order to eliminate or at least minimize some of the channelling flow occurring in the annular space, it has been found advantageous to use various types of devices mounted on the exterior of the well casing which tend to break up the channelling flow when the casing is rotated or reciproctaed. Some of the devices, commonly known as scratchers, also serve to remove part of the filter cake formed on the wall of the well bore. Most of these types of devices depend upon flexible elements of the devices protruding into the annular space to agitate the drilling fluid as the device is rotated or reciprocated. Certain of these conventional devices are only effective in agitating the drilling fluid when the well casing is rotated or reciprocated whereas it is desirable that such a device actually condition the drilling fluid as the casing is being lowered into the well bore. Moreover, some of these devices can be damaged and/or rendered relatively ineffective by the casing becoming off-centered in the well bore during running-in, reciprocation or rotation of the casing.

Accordingly, it is a principal object of this invention to provide a novel form of tool adapted to be mounted on a well casing wherein means are provided for both centering the casing in a well bore and conditioning the drilling fluid or mud flowing past the tool in the annular space between the well pipe and the well bore.

Another object of this invention is to provide a novel form of well pipe centering device wherein means are provided for diverting fluid flowing past the device for conditioning the fluid and interrupting any channelling flow occurring within the fluid.

A further object of this invention is to provide a tool for mounting on the exterior of a well casing wherein means are provided on the tool for resiliently conforming to the size and configuration of the well bore and for imparting a circumferential component to the direction of flow of fluid flowing past the tool in the annular space between the well pipe and the well bore. A more specific object is to provide such a tool which will impart a circumferential motion to most of the drilling fluid or mud present in the wall bore as the well casing which is supporting the tool is lowered into the well bore.

A still further object of this invention is to provide a well tool for increasing the velocity of the drilling fluid or cement slurry in the annulus, forcing the fluid or slurry outwardly against the well bore wall, and causing a swirling movement of the fluid or slurry by circumferentially and outwardly diverting the normal flow path of the fluid or slurry. A more specific object is to provide such a tool wherein the means for diverting the flow are positioned beneath spring centering means for protecting the flow diverting means from damage due to engaging the well bore wall.

A further object of this invention is to provide well pipe centering device having elements mounted between the collars of the device and under the spring centering elements of the device which would interfere with a conventional stop collar mounted on the well pipe between the collars of the device wherein novel collars are provided on the device to receive conventional stop collars. Another object is to provide such a device with said novel collars whereby the device is pulled by the leading collar of the device regardless of the direction of movement of the well pipe.

Other and more detailed objects and advantages of this invention will appear from the following description and the accompanying drawings.

In the drawings:

FIGURE 5 is an elevation view showing a modified form of the device of this invention mounted on a well pipe or casing and positioned in a well bore.

FIGURE 6 is a sectional plan view substantially on the line 6—6 as shown in FIGURE 5.

FIGURE 7 is a perspective view of the modified form of the device of this invention shown in FIGURES 5 and 6.

FIGURE 8 is a fragmentary sectional plan view taken substantially on the line 8—8 as shown in FIGURE 5.

FIGURE 9 is an elevation view showing a second modified form of the device of this invention mounted on a well pipe or casing and positioned in a well bore with portions shown in section for clarity.

FIGURE 10 is an elevation view of the modified form shown in FIGURE 9 illustrating the device installed on a well pipe without the spring bows collapsed.

FIGURE 11 is an elevation view similar to and showing the modified device of FIGURE 9 and illustrating the well pipe being raised with respect to the device.

FIGURE 12 is a sectional plan view taken substantially on the line 12—12 as shown in FIGURE 9.

Figure 1:
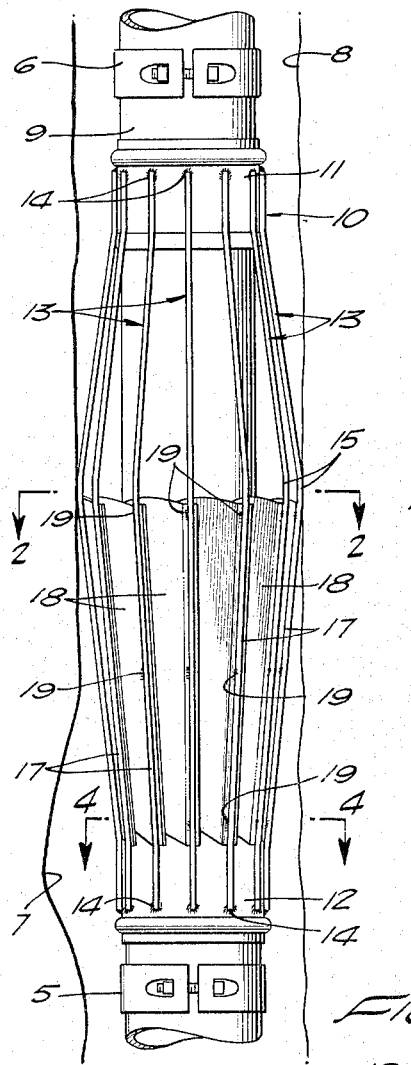
FIGURE 1 is an elevation view showing the device of this invention mounted on a well pipe or casing and positioned in a well bore.
Figure 3:
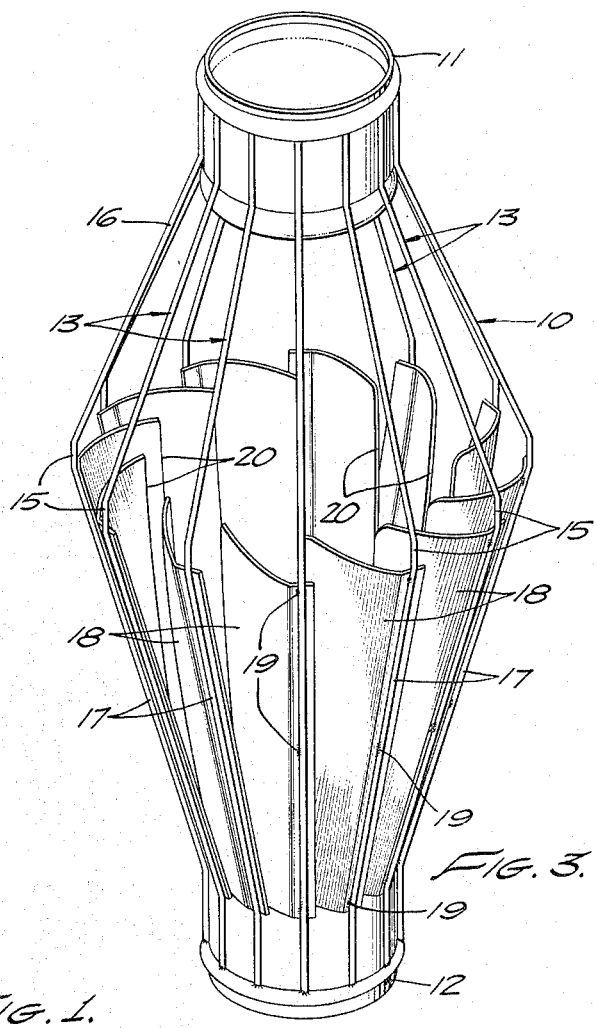
FIGURE 3 is a perspective view of the device of this invention.

Referring now to FIGURES 1 through 4, the device of this invention, generally designated 10, is provided with a pair of axially spaced and aligned collars 11 and 12 which are adapted to slidably and rotatably fit on the exterior surface of a well pipe or casing 9. A plurality of spring rods 13 extend longitudinally between the collars 11 and 12 and each rod 13 has one end secured to collar 11 and the other end secured to collar 12. The rods 13 may be secured to the collars 11 and 12 by any convenient and appropriate type of fastening means such as welding 14.

Each of the spring rods 13 is bowed outwardly from the collars 11 and 12 with a central portion 15 at the maximum radial displacement of the rod, an upper portion 16 which may be either curved or straight (as shown), and a lower portion 17 which is preferably straight, as shown. The spring rods 13 are preferably of a spring steel and formed to a shape whereby the portion 15 of the plurality of rod springs 13 define a circle having a diameter larger than the diameter of the well bore 8. Thus, when the device 10 is mounted on a well casing 9 and positioned in the well bore 8, the spring rods will engage the well bore wall so that the device 10 will tend to center the casing 9 within the well bore. Moreover, since the spring rods 13 are resilient, the rods will tend to expand to conform to enlarged portions of the well bore such as shown at 7.

Figures 2, 4:
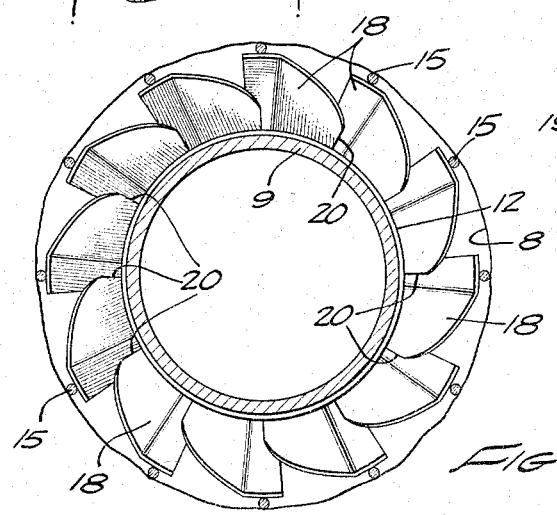
FIGURE 2 is a sectional plan view taken substantially on line 2—2 as shown in FIGURE 1.
FIGURE 4 is a fragmentary sectional plan view taken substantially on the line 4—4 as shown in FIGURE 1.

A panel or vane 18 is mounted on each spring rod 13 by any convenient means such as welding 19. Each vane 18 extends longitudinally from a location between the outer surface of collar 12 and the spring rod 13 to a location at or just below the portion 15 of the spring rod. The vanes 18 extend inwardly and circumferentially from the attached spring rod and may or may not, as desired, extend inwardly a sufficient distance to engage the outer surface of the well casing 9. The vanes 18 are preferably of relatively stiff but resilient materials such as, but not limited to, sheet metal. Referring to FIGURES 2 and 4, it is preferred that the panels or vanes 18 extend circumferentially a sufficient distance so that the "free" edge 20 of each vane is between the next adjacent spring rod 13 and the casing 9. By making each vane at least this wide, it may be seen that a vane cannot be inadvertently bent or forced outwardly beyond the rods 13 or, in effect, beyond the frusto-conical surface defined by the aggregation of all of the lower portions 17 of the spring rods 13. Furthermore, by this relationship between each vane 18 and the next adjacent spring rod 13, the lower ends of the vanes overlap and are held between the spring rods and the outer surface of the collar 12, as best shown in FIGURE 4.

In operation, the device 10 is slipped onto the casing 9 before the casing is run into the well bore 8 as is conventional. The device 10 may be retained at a particular location on the casing 9 by any of the well known conventional means such as securing a stop collar 6 to the casing above the collar 11, and securing a stop collar 5 to the casing below the collar 12. As the casing 9 is run into the well bore, 8, the device passes through the drilling fluid or mud present in the annular space between the outer surface of the casing 9 and the wall of the well bore 8. As may be seen in FIGURE 2, the outer surfaces of vanes 18 engage the fluid below and outside of the vanes as the casing 9 is lowered or as the fluid is pumped upwardly in the annular space. The drilling fluid or cement slurry is urged outwardly against the well bore wall 8 by the vanes and the relative velocity between the fluid and the device 10 is increased due to the reduction in cross-sectional area of the annulus. Continued relative movement between the fluid and the device causes the drilling fluid or cement slurry to passs laterally between adjacent vanes and then upwardly past the portions 16 of the spring rods 13. Thus, the drilling fluid is put into a swirling motion and the velocity is increased to thereby agitate the drilling fluid to a more fluid condition. When the casing 9 is in the desired location and circulation of the drilling fluid is resumed by pumping downward through the casing and upward in the annular space between the well bore wall and the exterior of the casing, as is conventional, the drilling fluid must pass the device 10 and is diverted by the vanes 18 in the manner described. The vanes 18 impart a circumferential component and an outward component to the direction of flow of the drilling fluid and increase the velocity of the flowing drilling fluid thereby agitating the drilling fluid and interrupting the channelling flow occuring at that location. The vanes 18 have the same effect on the cement slurry when such is introduced and pumped past the device 10.

In the modified form of the device of this invention shown in FIGURES 5 and 8, the device being generally designated 30, axially aligned and spaced collars 31 and 32 are provided similar to collars 11 and 12 of previously described device 10. A plurality of staves or spring bows 33 extend longitudinally between collars 13 and 32 and have their ends secured to the collars by any convenient means such as welding 34. The spring bows 33 may be similar in configuration to the bows of conventional centralizers as shown or of any other convenient configuration wherein the spring bows are bowed outwardly from the axis of the collars. Each spring bow 33 has a central portion 35 which is at or near the maximum radial displacement of that spring bow from the axis of the collars 31 and 32.

In the device 30 a panel or vane 36 is mounted on each of the spring bows 33 by any convenient means such as spot welding 37 near the upper end of each vane. The vanes 36 extend downwardly and inwardly to a location between the inside of the attached spring bow 33 and the outside surface of the collar 32. Each of the vanes 36 are relatively straight as at 38 from their attachment by welds 37 to their lower extremity for ease in flexing of the vanes during use. The vanes 36, similar to vanes 18, of the device 10, extend circumferentially and inwardly from the attached spring bow 33 as best shown in FIGURE 6. It is preferred that the vanes 36 extend circumferentially a sufficient distance to terminate beneath the next adjacent spring bow 33, as shown in FIGURES 6 and 8, for the same reasons that vanes 18 of the device 10 extend beneath the next adjacent spring rods 13 as described above. The lower ends of the vanes 36 are preferably not attached to collar 32 or bows 33 so that the lower ends of the panels 36 are free to move as the spring bows are compressed or expanded during use of the device 30.

In operation the device 30 is slipped onto the casing 9 and located in the desired position on the casing by any convenient or conventional means such as securing a stop collar 4 to the lower edge of collar 32 by means of weld 39 and then securing stop collar 4 to the casing by means of the wedge slip 3. The stop collar 4 may be of any conventional type such as that shown in United States Letters Patent No. 2,872,226 entitled Stop Collar for a Well Pipe. The casing 9 is then lowered into the well bore 8 in a conventional manner and the spring bows 3 and the vanes 36 function in a substantially identical manner as heretofore described for spring rods 13 and vanes 18, respectively, of device 10, for causing increased relative velocity between the device and the fluid and for imparting an outward and swirling motion to the drilling fluid and cement slurry. The spring bows 33 have the additional advantage over the use of spring rods such as 13 in that the bows make surface contact with the wall of the well bore 8 and are generally stiffer to accomplish a greater centralizing effect on the casing 9 with respect to the well bore 8.

In the modified form of the device of this invention shown in FIGURES 9 through 12, the device being generally designated 40, two axially aligned and spaced collars 41 and 42 are provided and have a different configuration than previously described collars 11, 12, 31 and 32. As in device 30 a plurality of outwardly bowed staves or spring bows 43 extend longitudinally between and are secured to collars 41 and 42 by any convenient means such as weld 44. A vane 45 is mounted on the inside of each spring bow 43 by means of spot welds 46 and extends downwardly with the lower end 47 positioned between the outer surface of collar 42 and the inside of the attached spring bow. The vanes 45 preferably each project circumferentially a sufficient distance to overlap on the inside of the next vane. Each vane 45 is similar in configuration and function to vanes 36 of device 30, except that the projecting portion 48 of vanes 45 may be relatively straight as shown in FIGURE 12 rather than curved as shown in FIGURE 6.

The collars 41 and 42 each have cylindrical portions 49 adapted to fit the exterior surface of the casing 9 and to provide a surface for mounting the ends of the spring bows 43. Portion 49 of collar 42 is axially long enough to support the lower ends 47 of the vanes 45. The collars 41 and 42 are also provided with cylindrical portions 50 adapted to fit the exterior of the casing 9. Between portions 49 and 50 of each collar 41 and 42 is provided an annular portion 51 of a greater diameter than portions 49 and 50 so that internal abutments 52 and 53 are formed on either end of portion 51. An aperture 54 is provided in each annular portion 51.

In operation stop collars 55 and 56 of any appropriate conventional design such as shown in United States Letters Patent No. 2,983,982 entitled Friction Clamp Collar, are positioned within the annular portions 51 of collars 41, 42, respectively, with the tightening bolts of the stop collars protruding through apertures 54 and the entire assembly is slipped onto the casing 9. Referring particularly to FIGURE 10, the device 40 is positioned at the desired location on the casing, stop collar 55 is moved into engagement with abutment 53 of collar 41 and affixed to the casing in the normal manner, and then stop collar 56 is moved into engagement with abutment 53 of collar 42 and affixed to the casing in the normal manner. It should be noted that spring bows 43 are in an uncollapsed (i.e., unstressed) condition as shown in FIGURE 10 and as the bows are partially collapsed in the well bore, as in FIGURES 9 and 11, the collars 41 and 42 move axially away from each other a short distance. As the casing 9 is lowered into the well bore 8 the spring bows 43 engage the well bore and stop collar 56 engages abutment 53 of collar 42 to pull the device 40 into the well bore by the leading collar, as shown in FIGURE 9, rather than push the device into the well bore by the trailing collar. Moreover, as the casing 9 is raised relative to the well bore 8, the stop collar 55 engages abutment 53 of collar 41, as shown in FIGURE 11, to pull the device 40 upwardly by the leading collar (collar 41) rather than push the device by the trailing collar (collar 42). Pulling the leading collar of a centralizer, regardless of direction of movement is advantageous for many known reasons and is usually accomplished by positioning a stop collar between the two collars of the centralizer. However, with vanes 45 projecting inwardly a stop collar mounted on the casing between collars 41 and 42 could damage the vanes upon movement of the casing relative to the well bore.

Thus, it may be seen that this invention provides a device which both centralizes the well pipe within the well bore and serves to condition the drilling fluid within the annular space for complete displacement of the drilling fluid as the drilling fluid or cement slurry flows upwardly past the device of this invention. The normal flow is diverted both outwardly and circumferentially, that is, certain outward and circumferential components of velocity are imparted to the flowing drilling fluid or cement slurry and relative velocity is increased whereby the drilling fluid and slurry is agitated to interrupt any channelling flow. The flow diverting means, i.e., the vanes, are effective regardless of off-centering of the casing or configuration of the well bore due to being supported on the centering means, i.e., the spring rods or bows, and also are protected by being beneath such centering means. Moreover, a novel collar form is provided by this invention which is particularly adapted for use with centralizers having inwardly projecting elements for providing normal pulling forces on the centralizer without possibility of damage to such projecting elements.

Having fully described my invention, it is to be understood that I do not wish to be limited to the details of the embodiments herein set forth or to the details illustrated in the drawings, but my invention is of the full scope of the appended claims.

I claim:

1. In a device adapted to be mounted on a well pipe for centering the well pipe in a well bore and conditioning the fluid contained within the well bore, the combination of: a pair of axially spaced and aligned collars adapted to be mounted on the well pipe, a plurality of circumferentially spaced spring bows extending longitudinally between said collars and having end portions secured to said collars, each said spring bow being bowed outwardly from said collars for engaging the well bore, a plurality of vanes, each vane having one end portion secured to the inside of one of said spring bows at least near the most outwardly bowed portion of that bow and having the other end portion slidably positioned between the outer surface of one of said collars and that said spring bow, each vane projecting circumferentially and inwardly a substantial proportion of the distance toward the well pipe for imparting movement to the fluid having a circumferential component of direction upon relative longitudinal movement between the fluid and the device and each said vane being resilient for flexing upon flexing of the attached spring bow.

2. In a device for use on a well pipe to be positioned in a well bore containing fluid, the combination of: a pair of axially spaced collars adapted to be mounted on the well pipe, a plurality of outwardly bowed spring means extending between and mounted on said pair of collars, an element mounted on at least one of said spring means and having a plate surface positioned at an angle to both the circumferential and longitudinal directions and extending across a substantial portion of the space between said spring means and the well pipe for causing swirling movement of the fluid upon relative longitudinal motion between the fluid and the device, said element being resilient for flexing upon flexing of the attached spring means, annular means adapted to be affixed to the well pipe, and at least one of said collars having an annular portion spaced outwardly for internally receiving said annular means.

3. In a device for use on a well pipe to be positioned in a well bore containing fluid, the combination of: a pair of axially spaced collars adapted to be mounted on the well pipe, a plurality of outwardly bowed spring means extending between and mounted on said pair of collars, an element mounted on at least one of said spring means and having a plate surface positioned at an angle to both the circumferential and longitudinal directions and extending across a substantial proportion of the space between said spring means and the well pipe for causing swirling movement of the fluid upon relative longitudinal motion between the fluid and the device, said element being resilient for flexing upon flexing of the attached spring means, a pair of annular means adapted to be affixed to the well pipe, and each said collar having an annular portion spaced outwardly for internally receiving said annular means.

4. The combination of claim 3 wherein an aperture is provided in each said annular portion for permitting external actuation of said annular means to affix said annular means to the well pipe.

5. The combination of claim 3 wherein each said annular portion of the collars has sufficient axial length to permit collapsing of said spring means and allow a predetermined amount of axial movement of the device relative to the well pipe.

6. In a device for use on a well pipe to be positioned in a well bore, the combination of: a pair of axially spaced and aligned collars, a plurality of outwardly bowed spring means extending between and mounted on said pair of collars, an element mounted on at least one of said spring means at an angle to the longitudinal direction and having a plate surface extending inwardly and circumferentially a substantial distance toward the well pipe from that spring means in a diagonal direction for causing circumferential movement of fluid moving past the device, said element being resilient for flexing upon flexing of the attached spring means, annular means adapted to be secured to the well pipe, and each of said collars having a pair of axially spaced portions adapted to fit the well pipe and an annular portion joining said spaced portions, each said annular portion having a larger diameter than said spaced portions for internally receiving one of said annular means.

References Cited by the Examiner
UNITED STATES PATENTS

| | | | |
|---|---|---|---|
| 2,117,538 | 5/1938 | Baker | 166—202 |
| 2,228,649 | 1/1941 | Welles | 166—172 |
| 2,312,600 | 3/1943 | Steps | 166—172 |
| 2,562,083 | 7/1951 | Clark | 166—241 |
| 2,602,512 | 7/1952 | Baker | 166—241 |
| 2,680,488 | 6/1954 | Atkinson | 166—241 |
| 2,731,816 | 1/1956 | Hall | 166—173 |
| 2,998,848 | 9/1961 | Wright et al. | 166—241 |
| 3,072,196 | 1/1963 | Love | 166—241 |

CHARLES E. O'CONNELL, *Primary Examiner.*

J. A. LEPPINK, *Assistant Examiner.*